(12) United States Patent
Gehrmann et al.

(10) Patent No.: US 10,963,552 B2
(45) Date of Patent: Mar. 30, 2021

(54) METHOD AND ELECTRONIC DEVICE FOR AUTHENTICATING A USER

(71) Applicant: FINGERPRINT CARDS AB, Gothenburg (SE)

(72) Inventors: Christian Gehrmann, Lund (SE); Peter Almers, Limhamn (SE); Steven Pope, Holte (DK); Mark Ruvald Pedersen, Copenhagen (DK); Anders Østergaard Nielsen, Frederiksberg C (DK)

(73) Assignee: FINGERPRINT CARDS AB, Gothenburg (SE)

( * ) Notice: Subject to any disclaimer, the term of this patent is extended or adjusted under 35 U.S.C. 154(b) by 0 days.

(21) Appl. No.: 16/645,357

(22) PCT Filed: Sep. 11, 2018

(86) PCT No.: PCT/SE2018/050913
§ 371 (c)(1),
(2) Date: Mar. 6, 2020

(87) PCT Pub. No.: WO2019/059827
PCT Pub. Date: Mar. 28, 2019

(65) Prior Publication Data
US 2020/0387589 A1 Dec. 10, 2020

(30) Foreign Application Priority Data
Sep. 20, 2017 (SE) .................... 1751162-7

(51) Int. Cl.
*G06F 21/00* (2013.01)
*G06F 21/32* (2013.01)
*G06K 9/00* (2006.01)

(52) U.S. Cl.
CPC ......... *G06F 21/32* (2013.01); *G06K 9/00013* (2013.01); *G06K 9/00087* (2013.01); *G06K 9/00926* (2013.01)

(58) Field of Classification Search
None
See application file for complete search history.

(56) References Cited

U.S. PATENT DOCUMENTS 9,374,370 B1 6/2016 Bent et al.
9,536,131 B1 1/2017 Chiang et al.
(Continued)

FOREIGN PATENT DOCUMENTS

EP 2945097 A1 11/2015
WO 2016133602 A1 8/2016

OTHER PUBLICATIONS

Mansour, Abdeljebar et al. A context-aware Multimodal Biometric Authentication for cloud-empowered systems. 2016 International Conference on Wireless Networks and Mobile Communications (WINCOM). https://ieeexplore.ieee.org/stamp/stamp.jsp?tp=&arnumber=7777227 (Year: 2016).*

(Continued)

*Primary Examiner* — Jeremiah L Avery
(74) *Attorney, Agent, or Firm* — RMCK Law Group, PLC

(57) ABSTRACT

The present disclosure generally relates to a method for authenticating a user by means of an electronic device, where the electronic device comprises a first and a second control unit adapted to process a biometric representation from a biometric sensor. Preferably, the second control unit
(Continued)

comprises a secure element and/or a secure block adapted to provide a secure processing environment. The present disclosure also relates to a corresponding electronic device and to a computer program product.

20 Claims, 5 Drawing Sheets

(56) References Cited

U.S. PATENT DOCUMENTS

| | | | |
|---|---|---|---|
| 9,613,252 B1 | 4/2017 | Chiang | |
| 2007/0248249 A1 | 10/2007 | Stoianov | |
| 2012/0185698 A1* | 7/2012 | Fiske | G06Q 20/40145 713/186 |
| 2013/0308838 A1 | 11/2013 | Westerman et al. | |
| 2015/0067827 A1 | 3/2015 | Lim et al. | |
| 2015/0143496 A1* | 5/2015 | Thomas | G06F 21/34 726/7 |
| 2016/0048670 A1* | 2/2016 | Kim | G06K 9/0008 382/117 |
| 2016/0125223 A1 | 5/2016 | Boshra et al. | |
| 2017/0053149 A1 | 2/2017 | Jiang et al. | |
| 2017/0124316 A1 | 5/2017 | Slaby et al. | |
| 2017/0141920 A1* | 5/2017 | Herder, III | G06F 21/575 |
| 2017/0185761 A1* | 6/2017 | Stanwood | H04L 9/0863 |
| 2018/0278421 A1* | 9/2018 | Karabina | G06K 9/00087 |

OTHER PUBLICATIONS

Basilio-Ramirez, J. et al. Multifactor authentication system based on biometrics and radio frequency identification. 2016 9th International Kharkiv Symposium on Physics and Engineering of Microwaves, Millimeter and Submillimeter Waves. https://ieeexplore.ieee.org/stamp/stamp.jsp?tp=&arnumber=7538169 (Year: 2016).*

Clancy, Charles et al., "Secure smartcardbased fingerprint authentication", WBMA '03 Proceedings of the 2003 ACM SIGMM Workshop on Biometrics Methods and Applications, ACM, US, Nov. 8, 2003, pp. 45-52.

European Search Report for EP Application No. 18859149.9 dated Oct. 9, 2020, 8 pages.

Xi, Kai et al., "A fingerprint based bio-cryptographic security protocol designed for client/server authentication in mobile computing environment", Security and Communication Networks, vol. 4, No. 5, Dec. 3, 2010, pp. 487-499.

PCT International Search Report and Written Opinion dated Dec. 3, 2018 for International Application No. PCT/SE2018/050913, 10 pages.

* cited by examiner

METHOD AND ELECTRONIC DEVICE FOR AUTHENTICATING A USER

CROSS-REFERENCE TO RELATED APPLICATIONS

This application is a 371 U.S. National Stage of International Application No. PCT/SE2018/050913, filed Sep. 11, 2018, which claims priority to Swedish Patent Application No. 1751162-7, filed Sep. 20, 2017. The disclosures of each of the above applications are incorporated herein by reference in their entirety.

TECHNICAL FIELD

The present disclosure generally relates to a method for authenticating a user by means of an electronic device, where the electronic device comprises a first and a second control unit adapted to process a biometric representation from a biometric sensor. Preferably, the second control unit comprises a secure element and/or a secure block adapted to provide a secure processing environment. The present disclosure also relates to a corresponding electronic device and to a computer program product.

BACKGROUND

The use of biometric techniques to identify and/or authenticate the identity of a user is increasing. Biometric techniques that are promoted for this use include voice, fingerprint, iris, vein pattern and other scans. Currently, the use of fingerprint sensors for capturing a fingerprint has shown to be specifically promising, for example due to its ease of integration with different types of electronic devices, such as smartphones, watches, tablets, or any other type of electronic device where personalized user interaction is advantageous. It has also been suggested to integrate such a fingerprint sensor with smartcard systems, possibly eliminating the need for the user to input a PIN code, for example when performing a financial transaction.

However, due to the mobility of the above mentioned electronic devices there is always a risk that the electronic device falls in the "wrong hands" and/or are presented with e.g. a hacker attack with the purpose to falsify or otherwise affect a biometric identification and/or authentication process.

To counteract such attempts there is a continued attempt to improve the applied biometric identification and/or authentication process. However, such attempts typically result in complex computational processing, thereby increasing the need to equip the electronic equipment with a faster and more computationally powerful processing environment.

In some implementations of the above mentioned types of electronic devices, where a high security and computationally powerful processing environment is desired, it has been suggested to "split" the computational performance into two parts, the first being a high-performance environment and the second being a high-security environment. The high-performance environment generally has higher computing performance but less security. Correspondingly, the high-security environment, for example comprising a so called secure element, generally has higher security but less computing performance.

An example of such an implementation is disclosed in U.S. Pat. No. 9,536,131. U.S. Pat. No. 9,536,131 discloses dividing the computational resources needed for performing fingerprint authentication between a first and a second processing unit, the first processing unit providing the above mentioned high-performance environment and the second processing unit providing the above mentioned high-security environment. In accordance to U.S. Pat. No. 9,536,131, the high-performance first processing unit is used for performing a comparison process between an acquired fingerprint image of a user and a prerecorded fingerprint template for a finger of the user that is to be authenticated.

Unfortunately, the solution presented in U.S. Pat. No. 9,536,131 introduces some possible security risks by means of how the computational processing is divided between the first and the second processing unit.

SUMMARY

In view of above-mentioned problems with prior-art, it is an object of the present disclosure to provide an improved solution for biometric authentication when using a mixed processing environment comprising both an "unsecure" and a "secure" processing environment as exemplified above. In particular, the present inventors have found that it may be desirable to make use of two separate and disjoint templates (below defined as a first (public) and a second (private) biometric template) for matching a candidate biometric representation for a user, the biometric representation for example derived from a captured fingerprint, an iris or a face of the user.

According to an aspect of the present disclosure, it is therefore provided a method of authenticating a user using an electronic device, the electronic device comprising a first control unit adapted to provide a processing environment having a first security level, and a second control unit adapted to provide a processing environment having a second security level, wherein the second security level is higher than the first security level, wherein the method comprises the steps of receiving a candidate biometric representation, determining, using the first control unit, a first set of biometric elements based on the candidate biometric representation, determining, using the first control unit, a first matching level between at least a portion of the first set of biometric elements and a first biometric template stored in association with the first control unit, forming a second set of biometric elements, wherein the second set of biometric elements comprises a selection of the first set of biometric elements, wherein the selection of the first set of biometric elements each has a first matching level above a first threshold, determining, using the first control unit, mapping information for the second set of biometric elements, receiving, at the second control unit, the second set of biometric elements and the mapping information, determining, using the second control unit, a second matching level between at least a portion of the second set of biometric elements and a second biometric template stored in association with the second control unit, wherein the determination is further based on the mapping information, and authenticating the user if the second matching level for a predetermined selection of the second set of biometric elements is above a second threshold, wherein the first biometric template comprises a first partial description of biometric features for the user, the second biometric template comprises a second partial description of corresponding biometric features for the user, the first partial description is at least partly different from the second partial description.

The principal idea behind the present disclosure resides in an improved segmentation of a fingerprint authentication process, where some portions of the fingerprint authentication process is performed by the first control unit and some other portions of the fingerprint authentication process is performed by the second control unit. In accordance to the present disclosure, the second control unit is adapted to have a higher security level than the first control unit. Consequently, in a preferred embodiment, the first control unit is adapted to provide a performance environment being higher as compared to the second control unit. In addition, in a possible embodiment of the present disclosure the second control unit is a secure processor, comprises a secure element and/or comprises a secure block adapted to provide a secure processing environment.

By means of the present disclosure, the first control unit will preferably handle all of the process of extracting relevant biometric data from the candidate biometric representation captured using the biometric sensor, thus to determine the first set of biometric elements. Such data may for example include identifiable features comprised within the biometric representation.

The first control unit is further arranged in communication with ("associated with") some form of memory element adapted to store the first biometric template, where the first biometric template comprises data relating to a previously enrolled biometric representation for the user. The data comprised within the first biometric template corresponds to and is arranged for comparison with the first set of biometric elements extracted from the biometric representation.

In accordance to the present disclosure, the first set of biometric elements are matched with the first biometric template using the first control unit, and a matching level is determined for at least a portion of the first set of the biometric elements. The matching levels for at least a portion of the first set of the biometric elements are subsequently compared to a first threshold, where a selection of the first set of biometric elements typically is considered to have a matching level above the first threshold, in turn forming a second set of biometric elements.

In addition to forming the second set of biometric elements, the first control unit is further adapted to determine mapping information, at least for the second set of biometric elements. The mapping information may for example comprise geometric information relating to the second set of biometric elements, such as for example an indication or an estimation of where each of the second set of biometric elements are "located" within the candidate biometric representation, or defined as provided with a relation (ordered set) between the second set of elements and the second biometrics template. The mapping information could also, possibly, comprise an indication or an estimation of an orientation of each of the second set of biometric elements within the candidate biometric representation.

It is in accordance to the present disclosure preferred if the first biometric template is disjoint from the second biometric template. In line with the above discussion, it is thus preferred if the first biometric template lacks relevant information for allowing a comparison or correlation process with the mapping information. Rather, the mapping information is provided, together with the second biometric elements, to the second control unit where such a comparison or correlation is to be performed.

Specifically, in accordance to the present disclosure the second set of biometric elements and the mapping information is used at the second control unit for determining a second matching level (for each of the second set of biometric elements). The mapping information may preferably be used for reducing the processing time needed to perform matching between the second set of biometric elements and the second biometric template.

The second matching level for at least a portion of the second set of biometric elements is then compared to a second threshold. The comparison will, if the presented user is the authentic one, result in at least an adequate number the second set of biometric elements being above the second threshold. If number the second set of biometric elements being above the second threshold is considered, by the second control unit, to be "enough", then the user may be authenticated.

In case the user is successfully authenticated, it may in accordance to the present disclosure be permitted to perform at least one action. Such an action may, for example, be that the electronic device allows the user to perform further operations using the electronic device, such as when the electronic device is a mobile phone or a tablet (unlocking). The at least one action may of course be any type of suitable action where there is a need for a biometric authentication, such as allowing a financial transaction to be processed, in case the electronic device e.g. is a smartcard.

Advantages with the invention specifically include a reduced processing time needed for successfully performing a biometric authentication process. Specifically, in accordance to the present disclosure, the initial selection process takes place together with the formation of mapping information (in the unsecure processing environment) that subsequently will be used in a final authentication process, where the mapping information preferably is structured in such a way that the second step of the authentication process (in the secure processing environment) may be performed in a swift and efficient manner as seen from a computational perspective.

In addition, by means of the present disclosure it is possible to allow for an advanced authentication processes with high computational requirements to be implemented while still ensuring the authentication process has, in comparison to prior art, high security and less risk of a successful hacker attack. In addition to the above, it should of course be understood that the general segmentation of the authentication process may be highly useful also in implementations of electronic devices where the computational capability of the secure processing environment is limited due to cost and/or storage/memory reasons, such as for example in relation to a smartcard implementation.

Within the context of the present disclosure, the expression "control unit" should be understood to include any type of computing device, such as an ASIC, a micro-processor, etc. It should also be understood that the actual implementation of such a control unit may be divided between more than a single element/device/circuit, collectively still referred to as a control unit. Preferably, the second control unit is arranged separately from the first control unit.

In one exemplary embodiment of the present disclosure, the first control unit is connected to and configured to control the operation of the biometric sensor. In one embodiment, the biometric sensor is a fingerprint sensor. The fingerprint sensor may be implemented using any kind of current or future fingerprint sensing principle, including for example capacitive, optical, thermal, or ultrasonic sensing technology, as well as a combination thereof. Both one and two-dimensional sensors are possible and within the scope of the present disclosure.

When the biometric sensor is a fingerprint sensor, it should be understood that the biometric representation should be interpreted broadly and may include a representation of a fingerprint pattern of a finger of the user or a fingerprint image. However, it should be understood that this should be interpreted broadly and may include any or all of a regular "visual image" of a fingerprint of a finger as well as a set of measurements relating to the finger when acquired using the fingerprint sensor, or any other digital representation of the information contained in such an image. A plurality of fingerprint representations/images may be subsequently acquired and fused together, where the resulting information is used as an input for determining the relevant or important feature information.

In another embodiment of the present disclosure, the biometric sensor may for example be adapted for capturing a representation of at least one of an iris and a face of the user. Such a sensor may possibly include a camera or a specifically adapted sensor arrangement suitable for capturing identifiable user distinct features of the iris or the face of the user.

In accordance to the present disclosure, the electronic device may be further adapted for handling an enrollment process for determining the first and the second biometric template. In one embodiment, an external (electronic) enrollment device may be connected to the electronic device and adapted for generation and transmission of the first and the second template for storage within the relevant computer memory provided in relation to the first and the second control unit.

In an alternative embodiment, it may be possible to allow the determination of the first and the second biometric template to be performed using the first control unit, where the second biometric template is transferred from the first control unit to the second control unit for storage in association with the second control unit, and the second biometric template is erased from the first control unit. Such an implementation may in some situations be considered reliable, even though the second biometric template is at least shortly available at the first control unit. This embodiment is specifically useful in case where the processing power available at the second control unit is considered "too low" for performing the enrollment process without greatly impairing the user experience due to a "too long" waiting period.

As an alternative, providing a higher security level, the determination of the first and the second template may be performed using the second control unit, and the first biometric template is transferred from the second control unit to the first control unit for storage in association with the first control unit. As understood if compared to the previous embodiment, in this embodiment the second biometric template will "never" leave the secure processing environment provided by the second control unit.

According to another aspect of the present disclosure, there is provided an electronic device, comprising a biometric sensor configured for capturing a candidate biometric representation of a user, a first control unit adapted to provide a processing environment having a first security level, and a second control unit adapted to provide a processing environment having a second security level, wherein the first security level is higher than the second security level, wherein the electronic device is adapted to receive the candidate biometric representation from the biometric sensor, determine, using the first control unit, a first set of biometric elements based on the candidate biometric representation, determine, using the first control unit, a first matching level between at least a portion of the first set of biometric elements and a first biometric template stored in association with the first control unit, form a second set of biometric elements, wherein the second set of biometric elements comprises a selection of the first set of biometric elements, wherein the selection of the first set of biometric elements each has a first matching level above a first threshold, determine, using the first control unit, mapping information for the second set of biometric elements, receive, at the second control unit, the second set of biometric elements and the mapping information, determine, using the second control unit, a second matching level between at least a portion of the second set of biometric elements and a second biometric template stored in association with the second control unit, wherein the determination is further based on the mapping information, and authenticate the user if the second matching level for a predetermined selection of the second set of biometric elements is above a second threshold, wherein the first biometric template comprises a first partial description of biometric features for the user, the second biometric template comprises a second partial description of corresponding biometric features for the user, the first partial description is at least partly different from the second partial description. This aspect of the present disclosure provides similar advantages as discussed above in relation to the previous aspect of the present disclosure.

In accordance to the present disclosure the electronic device is preferably at least one of a mobile phone, a tablet, a wearable electronic device, and a smartcard.

According to a further aspect of the present disclosure, there is provided a computer program product comprising a non-transitory computer readable medium having stored thereon computer program means for operating an electronic device, the electronic device, comprising a biometric sensor configured for capturing a candidate biometric representation of a user, a first control unit adapted to provide a processing environment having a first security level, and a second control unit adapted to provide a processing environment having a second security level, wherein the first security level is higher than the second security level, wherein the computer program product comprises code for receiving the candidate biometric representation from the biometric sensor, code for determining, using the first control unit, a first set of biometric elements based on the candidate biometric representation, code for determining, using the first control unit, a first matching level between at least a portion of the first set of biometric elements and a first biometric template stored in association with the first control unit, code for forming a second set of biometric elements, wherein the second set of biometric elements comprises a selection of the first set of biometric elements, wherein the selection of the first set of biometric elements each has a first matching level above a first threshold, code for determining, using the first control unit, mapping information for the second set of biometric elements, code for receiving, at the second control unit, the second set of biometric elements and the mapping information, code for determining, using the second control unit, a second matching level between at least a portion of the second set of biometric elements and a second biometric template stored in association with the second control unit, wherein the determination is further based on the mapping information, and code for authenticating the user if the second matching level for a predetermined selection of the second set of biometric elements is above a second threshold, wherein the first biometric template comprises a first partial description of biometric features for the user, the second biometric template comprises a second partial description of corresponding biometric features for the user, the first partial description is at least partly different from the second partial description. Also, this aspect of the present disclosure provides similar advantages as discussed above in relation to the previous aspects of the present disclosure.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1A:
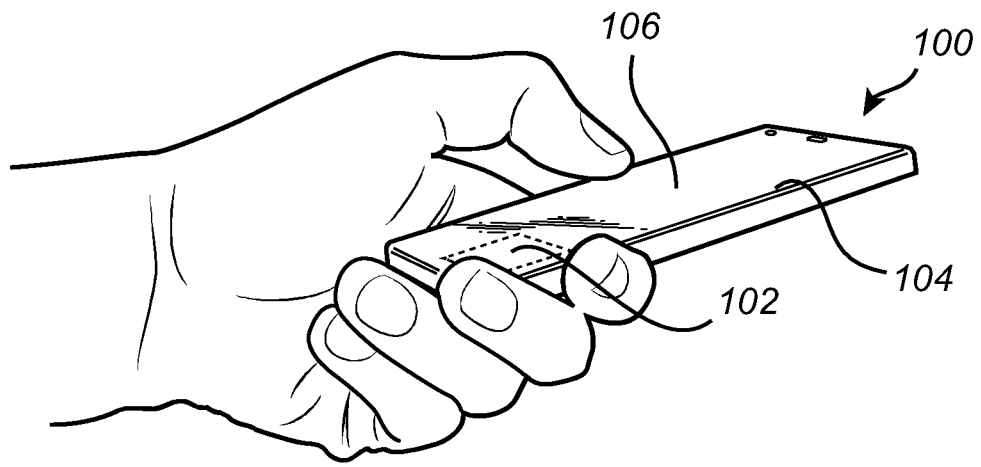
FIGS. 1A and 1B schematically exemplify different electronic devices according to the present disclosure, in the form of a mobile phone and a smartcard comprising an integrated fingerprint sensor.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Turning now to the drawings and to FIG. 1A in particular, there is schematically illustrated a first example of an electronic device according to the present disclosure, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may also be placed on the backside of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised within the mobile phone. It should furthermore be noted that the present disclosure may be applicable in relation to any other type of portable electronic device, such as a laptop, a remote control, a tablet computer, or any other type of present or future similarly configured device.

Figure 1B:
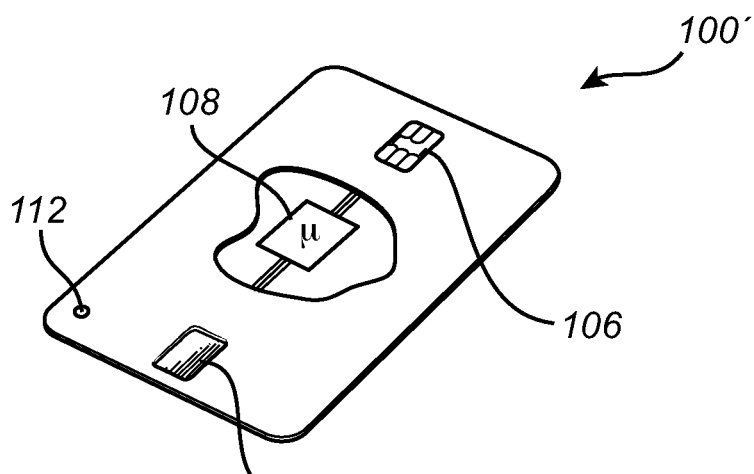

In FIG. 1B there is illustrated a second example of an electronic device according to the present disclosure, in the form of a smartcard 100', integrating a fingerprint sensing system including e.g. a corresponding fingerprint sensor 102 including a plurality of sensing elements and configured for capturing a fingerprint representation of a fingerprint pattern of a finger of a user, as well as at least one control unit arrangement 108 connected to and configured to control the operation of the fingerprint sensor 102. In this embodiment the fingerprint sensor 102 is arranged on the front side of the smart card 100'. However, the fingerprint sensor 102 may as an alternative (or also) be provided on a back side of the smart card 100'. The fingerprint sensor 102 may, for example, be used for authenticating the user when performing a payment/transaction, for example allowing the smart card 100', once the finger of the user has been enrolled, to interact with e.g. a POS terminal. Furthermore, the smart card 100' may integrate a plurality of contact pads 110 electrically connected to at least the control unit 108, possibly allowing for providing a wired connection with the POS terminal if/when the smart card 100' is inserted in a card slot provided with the POS terminal 302.

In addition, the smart card 100' may in some embodiments also include a user interface, such as for example a light source 112 (e.g. a light emitting diode, LED) integrated with the smart card carrier 100 and arranged in electrical connection with control unit 108. Still further, the smart card 100' preferably comprises means (not shown) for allowing wireless interaction with the POS terminal, such as adapted for allowing near field communication (NFC) between the smart card 100' and the POS terminal. Accordingly, in using wireless communication the user need not insert the smart card 100' into the card slot of the POS terminal. The NFC connection between the smart card 100' and the POS terminal may further be used for providing electrical power to the smart card 100', in a manner known to the skilled person as energy harvesting.

The control unit arrangement 108 is preferably arranged in communication with or comprises a memory, such as a database, e.g. for storing one or a plurality of fingerprint template for one or a plurality of fingers for the user. The control unit arrangement 108 may include microprocessors, microcontrollers, programmable digital signal processors or other programmable devices. The control unit arrangement 108 may also, or instead, each include application specific integrated circuits, programmable gate arrays or programmable array logic, programmable logic devices, or digital signal processors.

Where the control unit arrangement 108 includes programmable devices such as microprocessors, microcontrollers or programmable digital signal processors as mentioned above, the processors may further include computer executable code that controls operation of the programmable devices. It should be understood that all or some parts of the functionality provided by means of the control unit arrangement 108 may be at least partly integrated with the biometric sensor, such as fingerprint sensor 102. In relation to the present disclosure, the processing performed by the control unit arrangement 108 is partly split between at least a first and a second control unit as will be further elaborated below in relation to FIG. 3.

Figure 2:
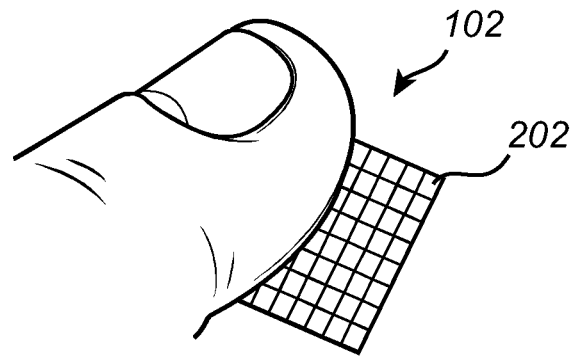
FIG. 2 schematically shows the fingerprint sensor array comprised in the electronic device in FIG. 1A or 1B.

With further reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment where 160×160 pixels are used. Other sizes are of course possible and within the scope of the present disclosure, including two-dimensional array with less pixels as compared to the above example. A single sensing element (also denoted as a pixel) is in FIG. 2 indicated by reference numeral 202. It should however, as indicated above, be understood that the present disclosure may be applicable also to other types of fingerprint sensing technologies, such as optical, thermal, ultrasonic, etc.), as well as a combination thereof. Both one and two-dimensional sensors are possible and within the scope of the present disclosure.

It should further be understood that the concept as is provided in line with the present disclosure may use other forms of biometric sensors for forming a biometric representation of the user. Such other types of sensors may for example include a camera for capturing an iris or a face of the user. Other specifically adapted sensor systems for capturing the iris and/or face of the user are also possible and within the scope of the present disclosure.

Figure 3:
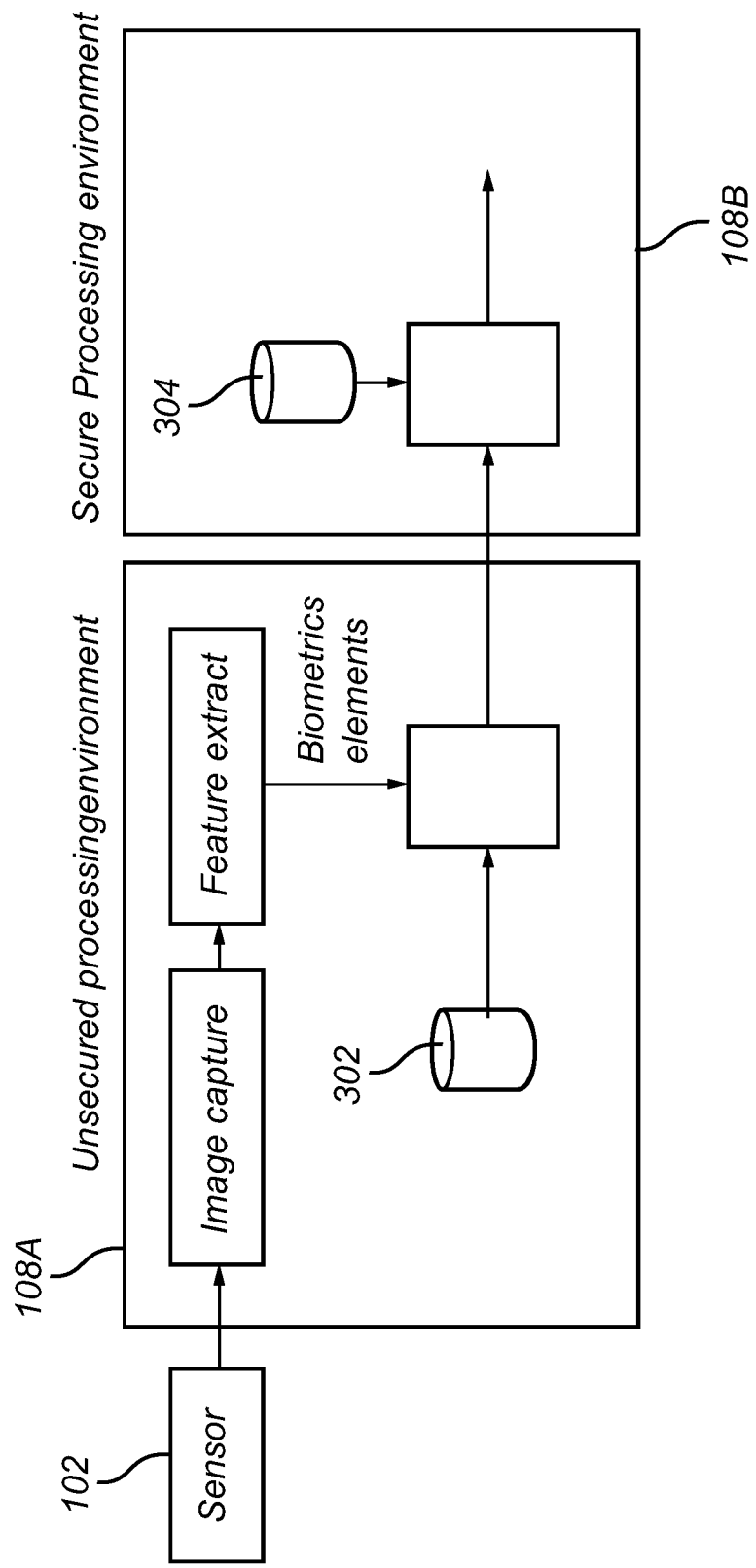
FIG. 3 conceptually illustrates an exemplary implementation of an electronic device according to the currently preferred embodiment of the present disclosure.

Turning now to FIG. 3, where it is conceptually illustrated a generalized possible implementation of the concept provided in accordance to the present disclosure. The example shown in FIG. 3 may generally be applicable to both of the examples of electronic devices 100, 100' as shown in FIGS. 1A and 1B, e.g. applicable to both the mobile phone and the smart card examples.

As was indicated above, the control unit arrangement 108 provided with the electronic device 100, 100' comprises a first 108A and a second 108B control unit. The second control unit 108B is configured to have a security level that is higher than a security level provided by the first control unit 108A. As mentioned above, the second control unit 108B is preferably a secure processor, comprises a secure element and/or comprises a secure block adapted to provide a secure processing environment. It should further be understood that the communication between the first and the second control unit 108A, 108B in some embodiments may be encrypted.

Figure 6:
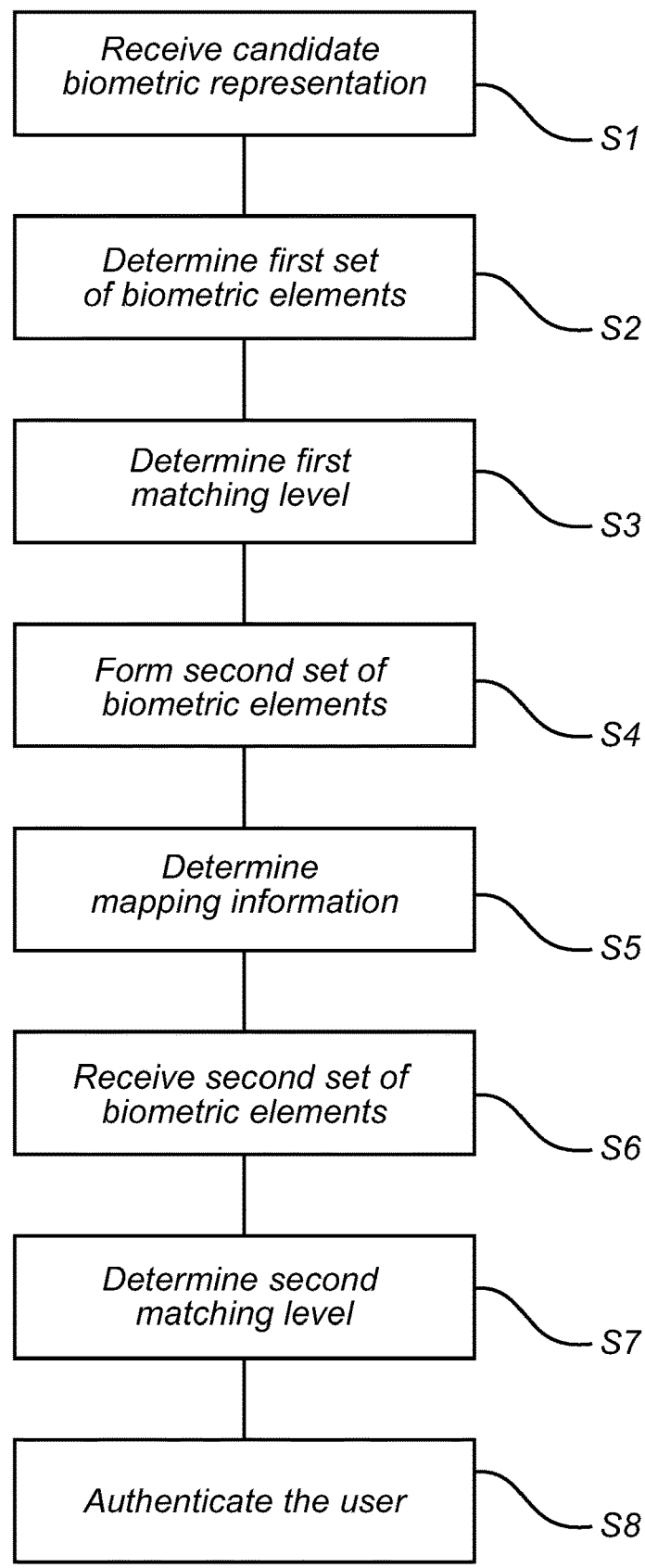
FIG. 6 is a flowchart disclosing the exemplary steps of the present disclosure.

In the example provided in FIG. 3 in conjunction to FIG. 6, the biometric sensor is the fingerprint sensor 102, where the fingerprint sensor 102 is communicatively coupled to the first control unit 108A, allowing a fingerprint representation of a finger of the user to be received, S1, at the first control unit 108A from the fingerprint sensor 102. Once the biometric representation, in FIG. 3 the fingerprint representation, is available at the first control unit 108A, the first control unit 108A will determine, S2, a first set of biometric elements (such as fingerprint features) from the fingerprint representation.

The first control unit 108A further implement a process for determining, S3, a first matching level between the first set of biometric elements and a public fingerprint template (first biometric template) stored with a memory element 302 comprised with the first control unit 108A. The memory element may for example be implemented for non-volatile storage of the public template.

Based on the determination, the first control unit 108A forms, S4, a second set of biometric elements, where the second set of biometric elements comprises a selection of the first set of biometric elements, wherein the selection of the first set of biometric elements each has a first matching level above a first threshold. The first threshold may be fixed or adjustable, for example based on a security level set for the electronic device 100/100'. The first control unit 108A further implements a process for determining, S5, mapping information for the second set of biometric elements. The process for determining the mapping information is further elaborated below in relation to FIG. 5.

Once the determination of the second set of biometric element and the mapping information has been completed by the first control unit 108, this information is transmitted from the first control unit 108A and received, S6, by the second control unit 108B. As indicated above, the information may possibly be transmitted in an encrypted form or over an encrypted channel.

The second control unit 108B will then use the received information for determining, S7, a second matching level between the second set of biometric elements and a second biometric template stored with a memory element 304 comprised with the second control unit 108B. This step further makes use of the mapping information for allowing a further reduction of the time needed for performing the determination process.

Subsequently, the second control unit 108B will review the determined second matching level for the second set of biometric elements in a step of authenticating, S8, the user. Specifically, the second control unit 108B will determine if at least a predetermined number of the second set of biometric elements have a matching level above the second threshold. Once authenticated, the user may be allowed to e.g. unlock the mobile phone 100 or to perform a financial transaction (or any other type of transaction) using the smartcard 100'.

Figure 4:
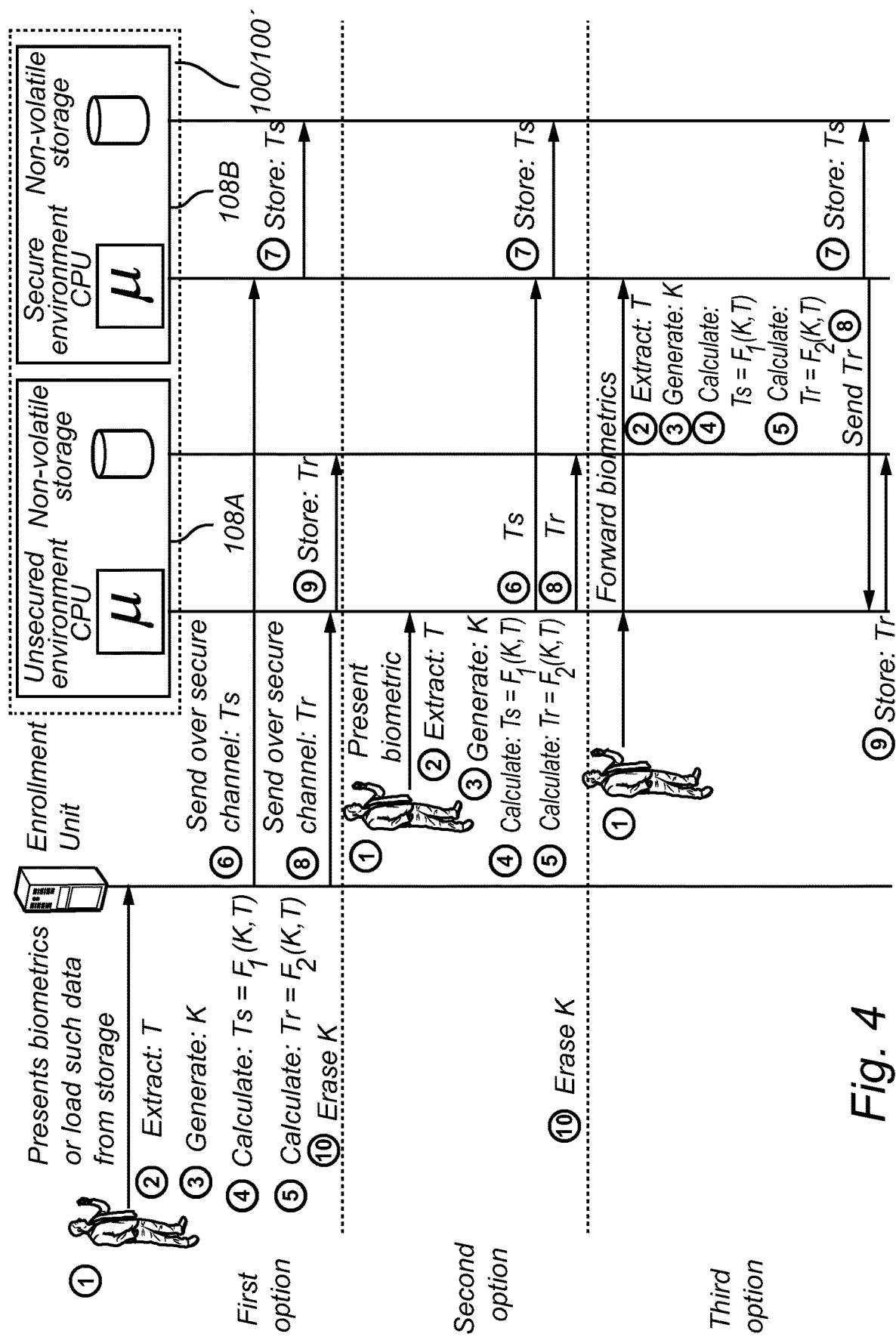
FIG. 4 shows different flows for biometric enrollment with the electronic device shown in FIG. 3.
Figure 5:
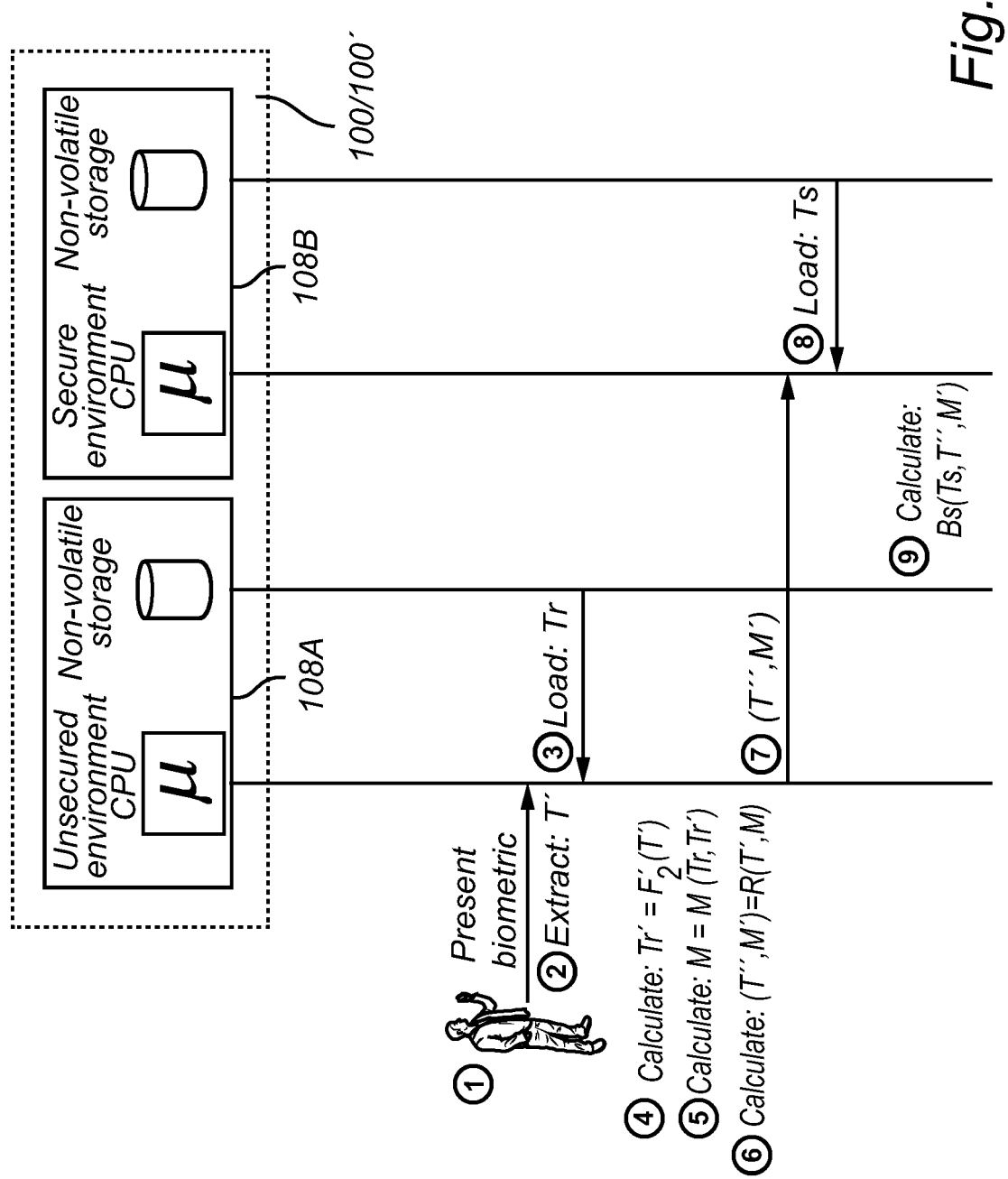
FIG. 5 shows an exemplary flow for biometric authentication with the electronic device shown in FIG. 3.

Turning now to FIGS. 4 and 5, providing a further elaboration in regards to biometric enrollment and authentication of the user. When processing the biometric representation of the user, the process may for example be implemented to first detect "points of interest" (PI), then a compute a binary representation of a small region around those points using that may be denoted as a "point descriptor" (PD) (or just "descriptor"). A "template" consists of these point's geometric locations together with their PD, defined as an "x,y" geometric location, or a "point position" (PP). In addition, the following terminology and notation is used throughout:

PD=$pd_1$, $pd_2$, . . . , $pd_n$: Point Descriptor vector.

PP=$pp_1$, $pp_2$, . . . , $pp_n$: Point Position vector.

Template: The mathematical representation of the features/data extracted from a biometric sample (for example, fingerprint image).

T: an enrolled biometric template.

T': a biometric authentication "candidate" template (sometimes referred to as a verification template).

$F_1(K,T)$=Ts: a non-invertible function (transform) taking a transform parameter K and template T as input and giving a transformed "secret template" Ts as output.

$F_2(K,T)$=Tr: a second non-invertible transform as above, but whose output is the transformed "public template" Tr.

$F'_2(F)$=Tr': a transformation function creating a public candidate template from a captured candidate template.

M(Tr,Tr')=M=$M_1$, $M_2$, . . . , $M_n$: a matching function that operates only on the public templates to give "match-data" of a specific form.

R(T', M)=(T'', M'): A "reduction function" that takes a candidate template T' and match-data M as input and returns a "reduced" candidate template T'', as well as a reduced match-data vector M'=$M_{i1}$, $M_{i2}$, . . . , $M_{ik}$, k<=n, (where $M_i$ was the input that created M').

Br(Tr,T',M'): a first binary matching function, taking a public biometrics template, Tr, a biometrics candidate, T', and a matching vector, M', as input and giving a binary decision, accept/reject, as output Bs(Ts,T''',M'): a second binary matching function. This one operates on a secret template Ts, a reduced candidate template T''', and a reduced match-data vector M'. Again, the decision is simply match or non-match. Note: it may also require the transform parameter K that was used to create Ts.

$S=(s_1, s_2, \ldots, s_n)$: a matching-score vector.

As discussed above, it may be allowed to biometrically enroll the user in accordance to a plurality of different alternative embodiments, all within the scope of the present disclosure. In FIG. 4 there is provided an illustration of three different methods for biometric enrollment. Specifically, the three different methods for biometric enrollment may be summarized as:

1. Ts and Tr are calculated outside the authentication device processing units and transferred to the unit during the enrollment.
2. Calculation of Ts and Tr takes place in the unsecured processing environment and Tr is kept in non-volatile memory at the unsecured processing environment while Ts is transferred to the secure processing environment for permanent storage in non-volatile memory. After the calculations are done, all template data used for the calculations are erased from the internal memory.
3. The enrolled template T, is transferred to the secure processing environment which then calculates Ts and Tr and then stores Ts in its internal secure memory while Tr is transferred to the unsecured processing environment for storage in non-volatile memory.

It should however be understood that further methods may be possible and within the scope of the present disclosure.

Turning now to FIG. 5, providing a detailed and elaborated example of biometric authentication of the user in line with the present disclosure. The steps shown in FIG. 5 may be summarized as outlined below:

1. A user presents their biometrics data which is processed by the first control unit 108A.
2. The first control unit 108A extracts a biometrics template candidate: T'.
3. The first control unit 108A calculates: Tr'=F'$_2$(T').
4. The first control unit 108A loads Tr from the memory 302.
5. The first control unit 108A calculates: M=M(Tr, Tr').
6. The first control unit 108A calculates: (T''',M')=R(T', M).
7. The first control unit 108A sends (T''',M') to the second control unit 108B for final matching.
8. The second control unit 108B load Ts from memory 304.
9. The second control unit 108B calculates Bs(Ts,T''',M') and only accepts the user as authenticated in case of a match.

It should be understood that the authentication process as outlined above may be implemented in a slightly different manner. Accordingly, the below description outlines three possible embodiments, all in line with the concept as defined by the present disclosure.

In a first possible embodiment, the function $F_1(K,T)$ takes a full template T consisting of the PDs, and PPs and essentially just drops the PDs. The secret template Ts is the list of the n PPs. Optionally, the parameter K defines a fixed, random permutation P of n elements and Ts=P (PPs).

The function $F_2(K,T)$ is defined similarly, essentially dropping the PPs, and Tr is the list of n PDs. If a permutation P is defined above, the same will be used in the following.

F'$_2$(T') is just the elements in the vector PD', i.e. the PDs of the candidate template T', possibly permuted by P.

The function M(Tr, Tr') outputs a match-data object M which is basically a map of potential PI pairs:
$\{(i_1 \to j_1), (i_2 \to j_2), \ldots, (i_r \to j_r)\}$ and their respective matching score vector $S=(s_1, s_2, \ldots, s_r)$. Here each (i,j) pair is one PI j from Tr, and a PI j from Tr' where every PI from each has a unique index, i.e. one won't see the same PI from either template in multiple pairings. Also note, not all PIs from either need necessarily appear in this list. Also note the so called "match score" in S should not be confused with the ultimate template match score—this is an intermediate step.

The function R reduces the candidate T' and takes away all points where there is no corresponding pair in M with a sufficiently high match score. The corresponding point pairs are removed from M to obtain M', and removing said points from T' leave you with T'''. The function Bs(Ts,T''',M') running on the second control unit 108B takes the match-data M', the coordinate values in T''', and the secret template Ts to decide the final match score of T versus T.

In a second possible embodiment, the very same functions are used as in the first embodiment with the following exceptions:

During registration/enrollment, instead of storing only the secret part of the template Ts on the second control unit 108B, also store the public part, Tr.

Instead of sending only the reduced match-data M' to the secure CPU for final matching, also send the complete candidate template T'. During matching, the second control unit 108B first uses a first matching function Br(Tr,T) to do a preliminary matching check. Only if this match is OK do we proceed with running the second matching function Bs(Ts,T',M') to get a final match verdict.

In a third possible embodiment, the very same functions are used as in the first embodiment with the following exceptions:

The parameter K defines a fixed, random permutation, P, of n+q elements.

The function $F_2(K,T)$ takes the random value K to produce a vector of q number of so-called "chaff descriptors". We denote this chaff point descriptor vector by PD^=(px$_1$,px$_2$, ... px$_q$).

Tr=$F_2$(K,T)=P(PD U PD^)=P(pd$_1$, pd$_2$, ... , pd$_n$,px$_1$, px$_2$, ... , px$_q$)

Similarly, the function $F_1(K,T)$ generates a null vector PP$^{\to}$ of length q.

Ts=$F_1$(K,T)=P(PP U PP^)=P(pp$_1$, pp$_2$, ... , pp$_n$, null, null, ... null)

The Bs(Ts, T',M') function gives a zero score for all match trials against null elements In summary, the present disclosure generally relates to a method for authenticating a user using an electronic device, where the electronic device comprises a first and a second control unit adapted to process a biometric representation from a biometric sensor. Preferably, the second control unit comprises a secure element and/or a secure block adapted to provide a secure processing environment. Advantages with the invention specifically include a reduced processing time needed for successfully performing a biometric authentication process.

In addition, the security level achieved in relation to the present disclosure comes from the fact that the unsecured part of the system, after enrollment, is unable to access the secret part of the template information. Hence, the security level achieved using the concept defined by the present disclosure is determined by the difficulty for an attacker, given the public information Tr, to find a matching template candidate T' that will also match against Ts. Hence, the security level achieved in relation to the present disclosure is determined by the correlation between Tr and Ts. In order to be secure, Ts must contain enough additional entropy compared to Tr in order to make it very hard for an attacker to come up with valid candidate T'. There is also a privacy concern in the solution as some template information is stored in the open (unsecured) part of the system. One must assume an attacker will be able to read this information. By making sure the public part of the template is shared by a great enough number of individuals, but still unique enough to provide fast final matching on the secure side of the system, one finds the right privacy/performance trade-off in relation to the present disclosure.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of authenticating a user using an electronic device, the electronic device comprising:
    a first control unit adapted to provide a processing environment having a first security level, and
    a second control unit adapted to provide a processing environment having a second security level, wherein the second security level is higher than the first security level,
    wherein the method comprises:
        receiving a candidate biometric representation;
        determining, using the first control unit, a first set of biometric elements based on the candidate biometric representation;
        determining, using the first control unit, a first matching level between at least a portion of the first set of biometric elements and a first biometric template stored in association with the first control unit;
        forming a second set of biometric elements, wherein the second set of biometric elements comprises a selection of the first set of biometric elements, wherein the selection of the first set of biometric elements each has a first matching level above a first threshold;
        determining, using the first control unit, mapping information for the second set of biometric elements;
        receiving, at the second control unit, the second set of biometric elements and the mapping information;
        determining, using the second control unit, a second matching level between at least a portion of the second set of biometric elements and a second biometric template stored in association with the second control unit, wherein the determination is further based on the mapping information; and
        authenticating the user if the second matching level for a predetermined selection of the second set of biometric elements is above a second threshold,
    wherein the first biometric template comprises a first partial description of biometric features for the user, the second biometric template comprises a second partial description of corresponding biometric features for the user, the first partial description is at least partly different from the second partial description.

2. The method according to claim 1, wherein the first biometric template is a public template and the second biometric template is a private template.

3. The method according to claim 1, wherein the first partial description of biometric features for the user is disjoint from the second partial description of the corresponding biometric features for the user.

4. The method according to claim 1, wherein mapping information comprises geometric information for the second set of biometric elements.

5. The method according to claim 4, further comprising:
    mapping the geometric information comprised with the mapping information with corresponding information comprised with the second biometric template.

6. The method according to claim 1, wherein the mapping information comprises a match-data vector (M') that is derived from match data (M), the match data being determined based on the first biometric template and the second set of biometric elements.

7. The method according to claim 1, wherein the electronic device further comprises a second memory element associated with the second control unit for storing the second biometric template.

8. The method according to claim 1, further comprising:
receiving an enrollment biometric representation;
determining the first and the second biometric template based on the enrollment biometric representation.

9. The method according to claim 8, wherein the determination of the first and the second biometric template is performed using the first control unit, the second biometric template is transferred to from the first control unit to the second control unit for storage in association with the second control unit, and the second biometric template is erased from the first control unit.

10. The method according to claim 8, wherein the determination of the first and the second template is performed using the second control unit, and the first biometric template is transferred to from the second control unit to the first control unit for storage in association with the first control unit.

11. An electronic device, comprising:
a biometric sensor configured for capturing a candidate biometric representation of a user,
a first control unit adapted to provide a processing environment having a first security level, and
a second control unit adapted to provide a processing environment having a second security level, wherein the first security level is higher than the second security level,
wherein the electronic device is adapted to:
receive the candidate biometric representation from the biometric sensor;
determine, using the first control unit, a first set of biometric elements based on the candidate biometric representation;
determine, using the first control unit, a first matching level between at least a portion of the first set of biometric elements and a first biometric template stored in association with the first control unit;
form a second set of biometric elements, wherein the second set of biometric elements comprises a selection of the first set of biometric elements, wherein the selection of the first set of biometric elements each has a first matching level above a first threshold;
determine, using the first control unit, mapping information for the second set of biometric elements;
receive, at the second control unit, the second set of biometric elements and the mapping information;
determine, using the second control unit, a second matching level between at least a portion of the second set of biometric elements and a second biometric template stored in association with the second control unit, wherein the determination is further based on the mapping information; and
authenticate the user if the second matching level for a predetermined selection of the second set of biometric elements is above a second threshold,
wherein the first biometric template comprises a first partial description of biometric features for the user, the second biometric template comprises a second partial description of corresponding biometric features for the user, the first partial description is at least partly different from the second partial description.

12. The electronic device according to claim 11, wherein the first biometric template is a public template and the second biometric template is a private template.

13. The electronic device according to claim 11, wherein the first partial description of biometric features for the user is disjoint from the second partial description of the corresponding biometric features for the user.

14. The electronic device according to claim 11, wherein the mapping information comprises a match-data vector (M') that is derived from match data (M), the match data being determined based on the first biometric template and the second set of biometric elements.

15. The electronic device according to claim 11, wherein second control unit is a secure processor, comprises a secure element and/or comprises a secure block adapted to provide a secure processing environment.

16. The electronic device according to claim 11, wherein the biometric sensor is a fingerprint sensor.

17. The electronic device according to claim 16, wherein the first control unit is connected to and configured to control the operation of the fingerprint sensor.

18. The electronic device according to claim 11, wherein the biometric sensor is a sensor adapted for capturing a representation of at least one of an iris and a face of the user.

19. The electronic device according to claim 11, wherein the electronic device is at least one of a mobile phone, a tablet, a wearable electronic device and a smartcard.

20. A computer program product comprising a non-transitory computer readable medium having stored thereon computer program means for operating an electronic device, the electronic device, comprising:
a biometric sensor configured for capturing a candidate biometric representation of a user,
a first control unit adapted to provide a processing environment having a first security level, and
a second control unit adapted to provide a processing environment having a second security level, wherein the first security level is higher than the second security level,
wherein the computer program product comprises:
code for receiving the candidate biometric representation from the biometric sensor;
code for determining, using the first control unit, a first set of biometric elements based on the candidate biometric representation;
code for determining, using the first control unit, a first matching level between at least a portion of the first set of biometric elements and a first biometric template stored in association with the first control unit;
code for forming a second set of biometric elements, wherein the second set of biometric elements comprises a selection of the first set of biometric elements, wherein the selection of the first set of biometric elements each has a first matching level above a first threshold;
code for determining, using the first control unit, mapping information for the second set of biometric elements;
code for receiving, at the second control unit, the second set of biometric elements and the mapping information;
code for determining, using the second control unit, a second matching level between at least a portion of the second set of biometric elements and a second biometric template stored in association with the second control unit, wherein the determination is further based on the mapping information; and code for authenticating the user if the second matching level for a predetermined selection of the second set of biometric elements is above a second threshold, wherein the first biometric template comprises a first partial description of biometric features for the user, the second biometric template comprises a second partial description of corresponding biometric features for the user, the first partial description is at least partly different from the second partial description.

\* \* \* \* \*